(12) United States Patent
Gonzales

(10) Patent No.: US 6,390,325 B1
(45) Date of Patent: May 21, 2002

(54) PORTABLE TANK

(76) Inventor: Ricardo Gonzales, 1715 Lofty Maple, Kingwood, TX (US) 77345

( * ) Notice: Subject to any disclaimer, the term of this patent is extended or adjusted under 35 U.S.C. 154(b) by 0 days.

(21) Appl. No.: 09/899,693

(22) Filed: Jul. 5, 2001

(51) Int. Cl.[7] .................................................. B60P 3/22
(52) U.S. Cl. ................... 220/567.2; 220/1.5; 220/4.12; 220/565
(58) Field of Search ................................ 220/1.5, 4.12, 220/565, 567.2; 280/837

(56) References Cited

U.S. PATENT DOCUMENTS

| | | | | |
|---|---|---|---|---|
| 4,108,326 A | * | 8/1978 | Bertolini | 220/1.5 |
| 4,589,565 A | * | 5/1986 | Spivey | 220/1.5 X |
| 5,033,637 A | * | 7/1991 | Webb | 220/565 |
| 5,213,367 A | * | 5/1993 | Norman, Jr. et al. | 220/1.5 X |
| 5,273,180 A | * | 12/1993 | Whatley, Jr. | 220/565 |
| 5,346,093 A | * | 9/1994 | De Benedittis et al. | 220/4.12 X |
| 6,279,955 B1 | * | 8/2001 | Fisher | 220/1.5 X |

* cited by examiner

*Primary Examiner*—Steven Pollard
(74) *Attorney, Agent, or Firm*—John R Casperson

(57) ABSTRACT

The invention is a tank trailer which can be towed to location. It is generally rectilinear, although the roof slopes at the back end, where the stairs are. The stairs enable the top of the tank to be accessed by personnel without having to clamber over the piping assembly mounted low on the end of the tank The dual staircases also enable personnel to safely move from tank to tank when several of them are parked alongside each other.

10 Claims, 2 Drawing Sheets

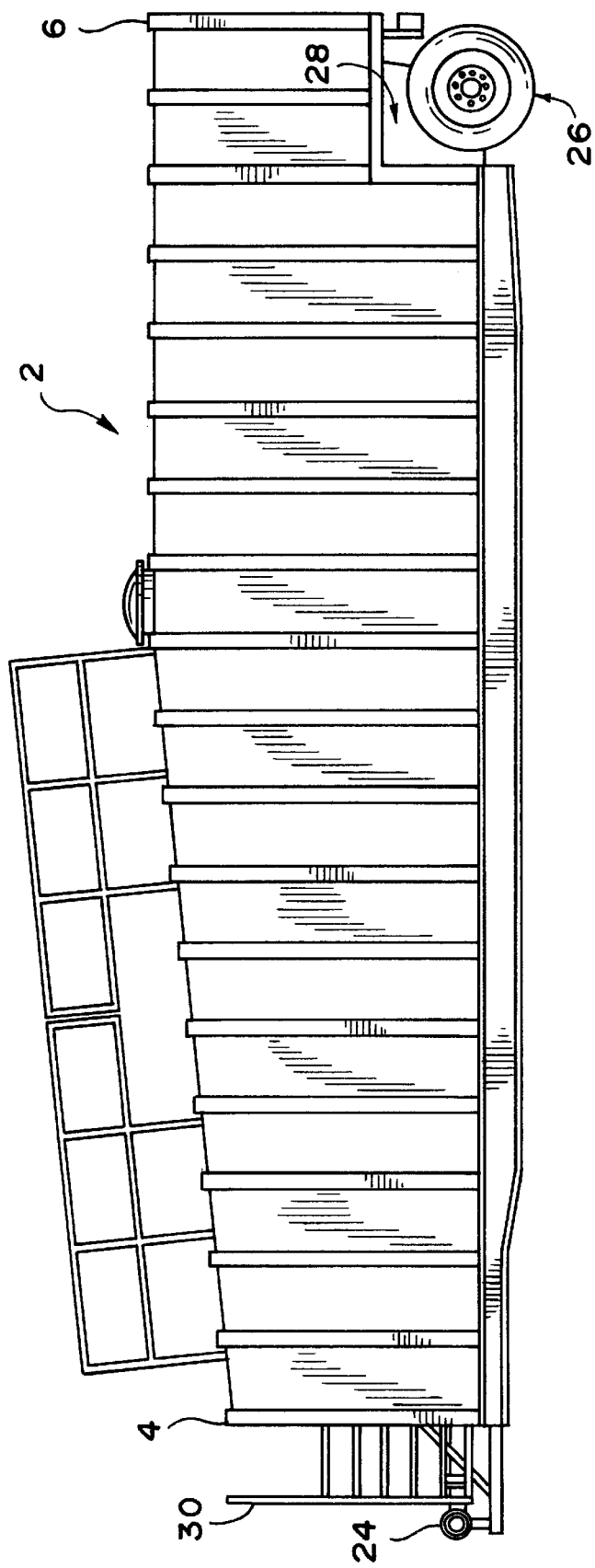

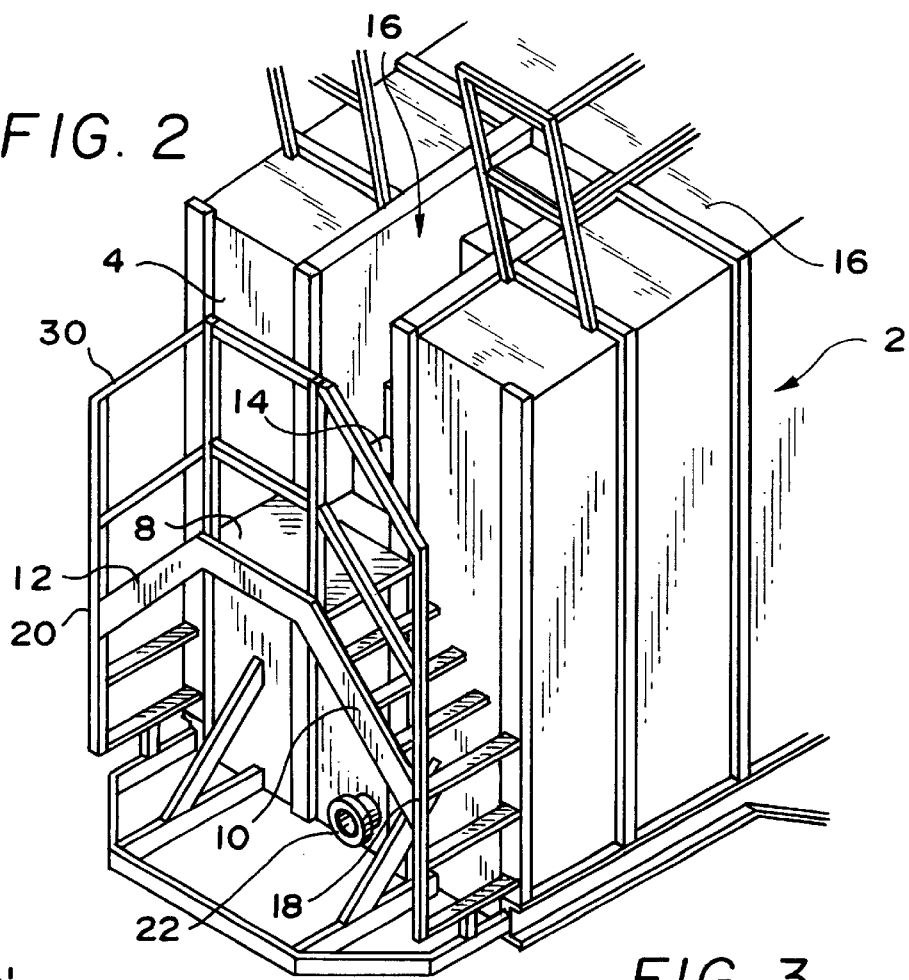
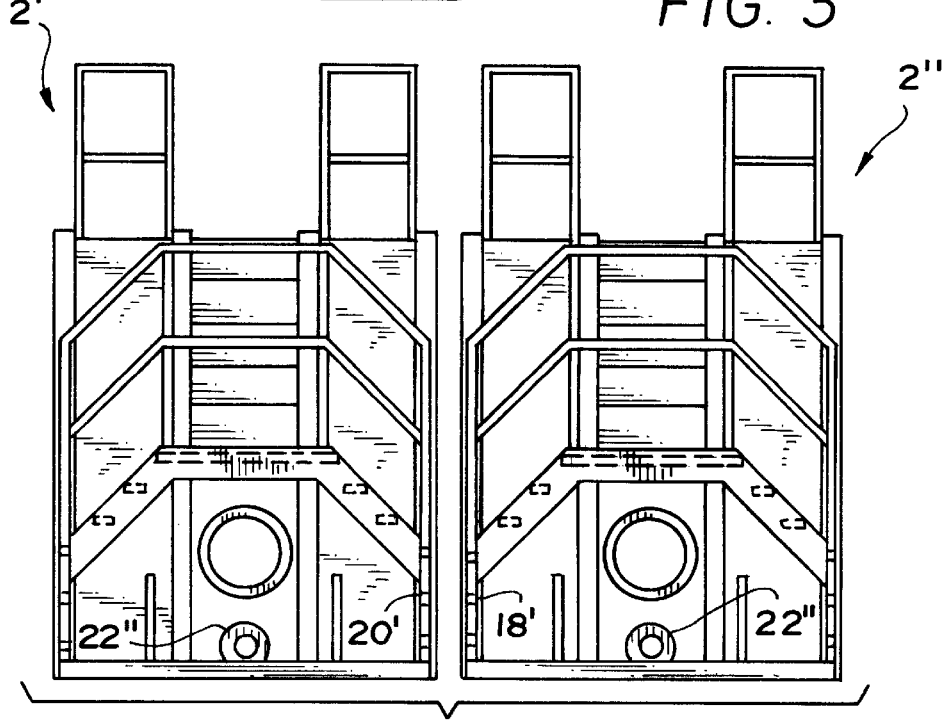

PORTABLE TANK

BACKGROUND OF THE INVENTION

This invention relates generally to portable storage tanks of several hundred barrels capacity.

There is a recurring need for high capacity, portable tankage in the oil and gas drilling, refining and petrochemical industries. Because the tanks are often present on site for only a few weeks, they can present unfamiliar hazards for personnel who work on or around them. The greatest hazard is posed for workers who climb onto the tanks, as a misstep or trip can lead to a fall from several feet onto a hard surface.

This presents a need in several industries for portable tankage which is constructed so as to minimize the risk of injury to personnel from trips or falls.

SUMMARY OF THE INVENTION

In one embodiment of the invention, there is provided a generally box-shaped elongated storage tank for containing liquids. The tank has a first end and a second end. A landing extends from the first end and a pair of opposed laterally extending stairways extend downwardly from the landing. The stairways enable personnel to access to the landing from ground level or from an adjacent storage tank without coming to the ground.

In a preferred embodiment, a conduit is in communication with the storage tank through the first end of the storage tank at a location beneath the landing. By avoiding the use of ladders and by positioning the piping assembly for the tank beneath the landing, where workers need not clamber over it in order to access the roof of the tank, worker hazards are greatly reduced.

In another embodiment of the invention, a battery of portable tanks is formed by at least a pair of portable, generally box-shaped elongated storage tanks for containing liquids which are positioned in close side by side relationship. Each storage tank has a first end and a second end, a landing extending from the first end, and a pair of opposed laterally extending stairways extending downwardly from the landing. A bottom end of a laterally extending stairway from a first tank of the pair is positioned alongside a bottom end of a laterally extending stairway from a second tank of the pair to enable personnel to safely move from the fist tank to the second tank without coming to the ground.

BRIEF DESCRIPTION OF THE DRAWINGS

FIG. 1 is a side view of a portable tank which embodies certain features of the present invention.

FIG. 2 is a perspective view of one end of the tank shown in FIG. 1.

FIG. 3 is an end view of a pair of tanks as shown in FIGS. 1 and 2 in side by side relationship.

DETAILED DESCRIPTION OF THE INVENTION

As shown in FIGS. 1 and 2, a generally box-shaped elongated storage tank 2 for containing liquids has a first end 4 and a second end 6. A landing 8 extends from the first end and a pair of opposed laterally extending stairways 10, 12 extend downwardly from the landing to enable personnel to access the landing from ground level or from an adjacent storage tank without coming to the ground.

Preferably a generally longitudinally extending stairway 14 extends upwardly from the landing to a roof 16 of the storage tank enabling personnel to safely access the roof of the tank from the landing. The generally longitudinally extending stairway is preferably positioned in a generally longitudinally extending notch 16 formed in the storage tank which leads from the landing to the roof to avoid a ladder while maintaining the compactness of the device.

Each of the opposed laterally extending stairways has a lower end 18, 20 which is preferably positioned in substantial alignment with a side wall of the storage tank. This enables multiple storage tanks to be positioned closely side by side. See FIG. 3. This arrangement is facilitated where the landing and the notch each has a width which is substantially less than a width of the storage tank.

The plumbing for the storage tank is preferably at least partially positioned beneath the landing and ladders, to reduce the risk of tripping personnel. The storage tank thus preferably further comprises a conduit 22 in communication with the storage tank through the first end of the storage tank at a location beneath the landing. A manifold 24 which connects the conduit to other devices is connected in flow communication to the conduit. See FIG. 1.

An axle assembly 26 is preferably positioned in a generally transversely extending notch 28 formed in the storage tank at a bottom of the second end of the tank. Means (not shown) for connecting the tank to a tow vehicle is provided under the front end of the tank.

To provide further protection, a handrail 30 is preferably positioned along an outside edge of the landing and the pair of lateral stairways. In the illustrated embodiment, a portion of the roof adjacent the first end of the storage tank slopes toward the first end of the storage tank. The tank can be constructed from steel plate on a trailer frame.

With reference to FIG. 3, a battery of portable tanks comprising at least a pair of portable, generally box-shaped elongated storage tanks 2', 2" for containing liquids which are positioned in close side by side relationship. Each tank can be as described before, having a first end and a second end, a landing extending from the first end, and a pair of opposed laterally extending stairways extending downwardly from the landing. A bottom end 20' of a laterally extending stairway from a first tank of the pair is positioned alongside a bottom end 18" of a laterally extending stairway from a second tank of the pair to enable personnel to safely move from the first tank to the second tank without coming to the ground or having to clamber over conduits 22' or 22".

While certain preferred embodiments of the invention have been described herein, the invention is not to be construed as being so limited, except to the extent that such limitations are found in the claims.

What is claimed is:

1. A generally box-shaped elongated storage tank for containing liquids and having a first end and a second end, wherein a landing extends from the first end and a pair of opposed laterally extending stairways extend downwardly from the landing to enable personnel to access the landing from ground level or from an adjacent storage tank without coming to the ground.

2. A generally box-shaped elongated storage tank as in claim 1, wherein a generally longitudinally extending stairway extends upwardly from the landing to a roof of the storage tank enabling personnel to access the roof from the landing.

3. A generally box-shaped elongated storage tank as in claim 2 wherein the generally longitudinally extending stairway is positioned in a generally longitudinally extending notch formed in the storage tank and leading from the landing to the roof.

4. A generally box-shaped storage tank as in claim 3 wherein a portion of the roof adjacent the first end of the storage tank slopes toward the first end of the storage tank.

5. A generally box-shaped elongated storage tank as in claim 3 wherein each of the opposed laterally extending stairways has a lower end which is positioned in substantial alignment with a side wall of the storage tank.

6. A generally box-shaped elongated storage tank as in claim 5 wherein the landing and the notch each has a width which is substantially less than a width of the storage tank.

7. A generally box-shaped storage tank as in claim 5 further comprising a conduit in communication with the storage tank through the first end of the storage tank at a location beneath the landing.

8. A generally box-shaped storage tank as in claim 2 further comprising an axle assembly positioned in a generally transversely extending notch formed in the storage tank at a bottom of the second end.

9. A generally box-shaped storage tank as in claim 2 further comprising a handrail positioned along an outside edge of the landing and the pair of lateral stairways.

10. A battery of portable tanks comprising at least a pair of portable, generally box-shaped elongated storage tanks for containing liquids which are positioned in close side by side relationship, each storage tank having a first end and a second end, a landing extending from the first end, and a pair of opposed laterally extending stairways extending downwardly from the landing, wherein a bottom end of a laterally extending stairway from a first tank of the pair is positioned alongside a bottom end of a laterally extending stairway from a second tank of the pair to enable personnel to safely move from the first tank to the second tank without coming to the ground.

* * * * *